(12) United States Patent
Lyu et al.

(10) Patent No.: US 8,096,820 B2
(45) Date of Patent: Jan. 17, 2012

(54) MULTI-CONNECTOR, AND CHARGING CABLE AND DATA CABLE HAVING THE SAME

(75) Inventors: Min Jeong Lyu, Suwon-si (KR); Byoung Soo Lee, Yongin-si (KR); Jae Seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 12/275,618

(22) Filed: Nov. 21, 2008

(65) Prior Publication Data

US 2009/0149050 A1 Jun. 11, 2009

(30) Foreign Application Priority Data

Dec. 5, 2007 (KR) .................. 10-2007-0125252

(51) Int. Cl.
*H01R 13/44* (2006.01)
(52) U.S. Cl. ..................................... 439/141
(58) Field of Classification Search .......... 439/131, 439/141, 171, 172, 598; 320/101, 102, 107, 320/134, 528
See application file for complete search history.

(56) References Cited

U.S. PATENT DOCUMENTS

| | | | |
|---|---|---|---|
| 6,289,402 B1 * | 9/2001 | Davis | 710/31 |
| 6,676,420 B1 * | 1/2004 | Liu et al. | 439/131 |
| 6,733,328 B2 * | 5/2004 | Lin et al. | 439/501 |
| 2003/0034756 A1 * | 2/2003 | Chang | 320/107 |
| 2006/0088018 A1 * | 4/2006 | Black et al. | 370/338 |
| 2006/0236175 A1 * | 10/2006 | Usami et al. | 714/724 |
| 2006/0293080 A1 * | 12/2006 | Cho | 455/556.1 |
| 2007/0182365 A1 * | 8/2007 | Yang | 320/107 |
| 2009/0039827 A1 * | 2/2009 | Fowler | 320/101 |

* cited by examiner

*Primary Examiner* — Alexander Gilman
(74) *Attorney, Agent, or Firm* — H.C. Park & Associates, PLC

(57) ABSTRACT

A multi-connector, and a charging cable and a data cable including the same are disclosed. The multi-connector includes a 24-pin connector and a 20-pin connector that may be used regardless of the type and manufacturer of a portable terminal. The multi-connector includes a first connector body having a first connector installed on a side thereof, a second connector body having a second connector installed on a side thereof, and a hinge shaft to connect the first connector body to the second connector body. The first connector body and/or the second connector body are pivotable about the hinge shaft.

11 Claims, 5 Drawing Sheets

MULTI-CONNECTOR, AND CHARGING CABLE AND DATA CABLE HAVING THE SAME

CROSS REFERENCE TO RELATED APPLICATION

This application claims priority from and the benefit of Korean Patent Application No. 10-2007-0125252, filed on Dec. 5, 2007, which is hereby incorporated by reference for all purposes as if fully set forth herein.

BACKGROUND OF THE INVENTION

1. Field of the Invention

The present invention relates generally to a connector of a portable terminal and, more particularly, to a multi-connector having a 24-pin connector and a 20-pin connector, and a charging cable and a data cable having the same.

2. Discussion of the Background

Recently, a portable terminal occupies a position of necessities of life. The portable terminal requires a battery to supply stable power to a system thereof and the battery may be reused after being recharged. The portable terminal may allow a user to simply call and exchange data such as MP3 files, games, photographs, and the like with other portable terminals or computers.

To recharge the battery and/or perform data exchange with the portable terminal, a charging cable and a data cable are respectively connected to sockets of the portable terminal via connectors. A 24-pin connector standardized by Korea Telecommunications Technology Association (KTTA) is commonly used as the connector of the portable terminal. However, use of a 20-pin connector is increasing in newly released models of portable terminals reflecting the trend of miniaturization and lightness in weight.

When a 24-pin connector needs to be connected to the portable terminal having a 20-pin socket, the 24-pin connector may be connected to the portable terminal through a 20-pin gender adapter (also referred to as a "connection conversion adapter").

Since a 24-pin connector may be connected to a 20-pin socket of a portable terminal only when a 20-pin gender adapter is available, a user must buy the 20-pin gender adapter to connect the 24-pin connector to the portable terminal. Moreover, when a gender adapter is used, a loose contact occurring in the socket may cause the portable terminal to malfunction.

SUMMARY OF THE INVENTION

The present invention provides a multi-connector usable regardless of the type and manufacturer of portable terminals, and a charging cable and a data cable including the same.

Additional features of the invention will be set forth in the description which follows, and in part will be apparent from the description, or may be learned by practice of the invention.

The present invention discloses a multi-connector including a first connector body having a first connector installed on a side thereof, a second connector body having a second connector installed on a side thereof, and a hinge shaft connecting the first connector body to the second connector body. The first connector body and/or second connector body are pivotable about the hinge shaft.

The present invention also discloses a multi-connector including a connector body, a first connector installed on a first side of the connector body, and a second connector installed on a second side of the connector body.

The present invention also discloses a charging cable including a multi-connector, a charging unit comprising a power plug, and a DC power unit, and a cable to connect the multi-connector to the charging unit. The multi-connector includes a first connector body having a first connector installed on a side thereof, a second connector body having a second connector installed on a side thereof, and a hinge shaft connecting the first connector body to the second connector body. The first connector body and/or second connector body are pivotable about the hinge shaft.

The present invention also discloses a charging cable including a multi-connector, a charging unit comprising a power plug, and a DC power unit, and a cable to connect the multi-connector to the charging unit. The multi-connector includes a connector body, a first connector installed on a first side of the connector body, and a second connector installed on a second side of the connector body.

The present invention also discloses a data cable including a multi-connector, a universal serial bus (USB) connector, and a cable to connect the multi-connector to the USB connector. The multi-connector includes a first connector body having a first connector installed on a side thereof, a second connector body having a second connector installed on a side thereof, and a hinge shaft connecting the first connector body to the second connector body. The first connector body and/or second connector body are pivotable about the hinge shaft.

The present invention also discloses a data cable including a multi-connector, a universal serial bus (USB) connector, and a cable to connect the multi-connector to the USB connector. The multi-connector includes a connector body, a first connector installed on a first side of the connector body, and a second connector installed on a second side of the connector body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
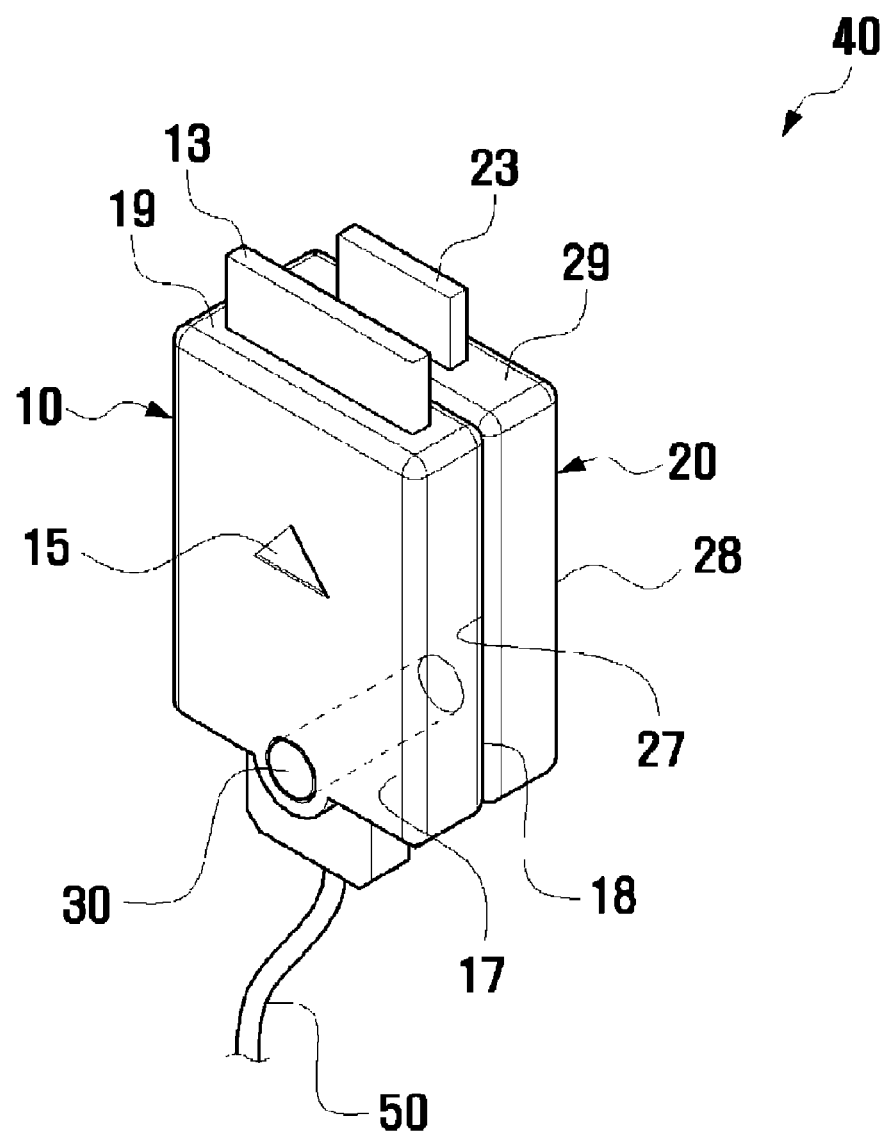
FIG. 1 is a perspective view showing a multi-connector according to an exemplary embodiment of the present invention before a second connector body pivots.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Exemplary Embodiment 1

Figure 2:
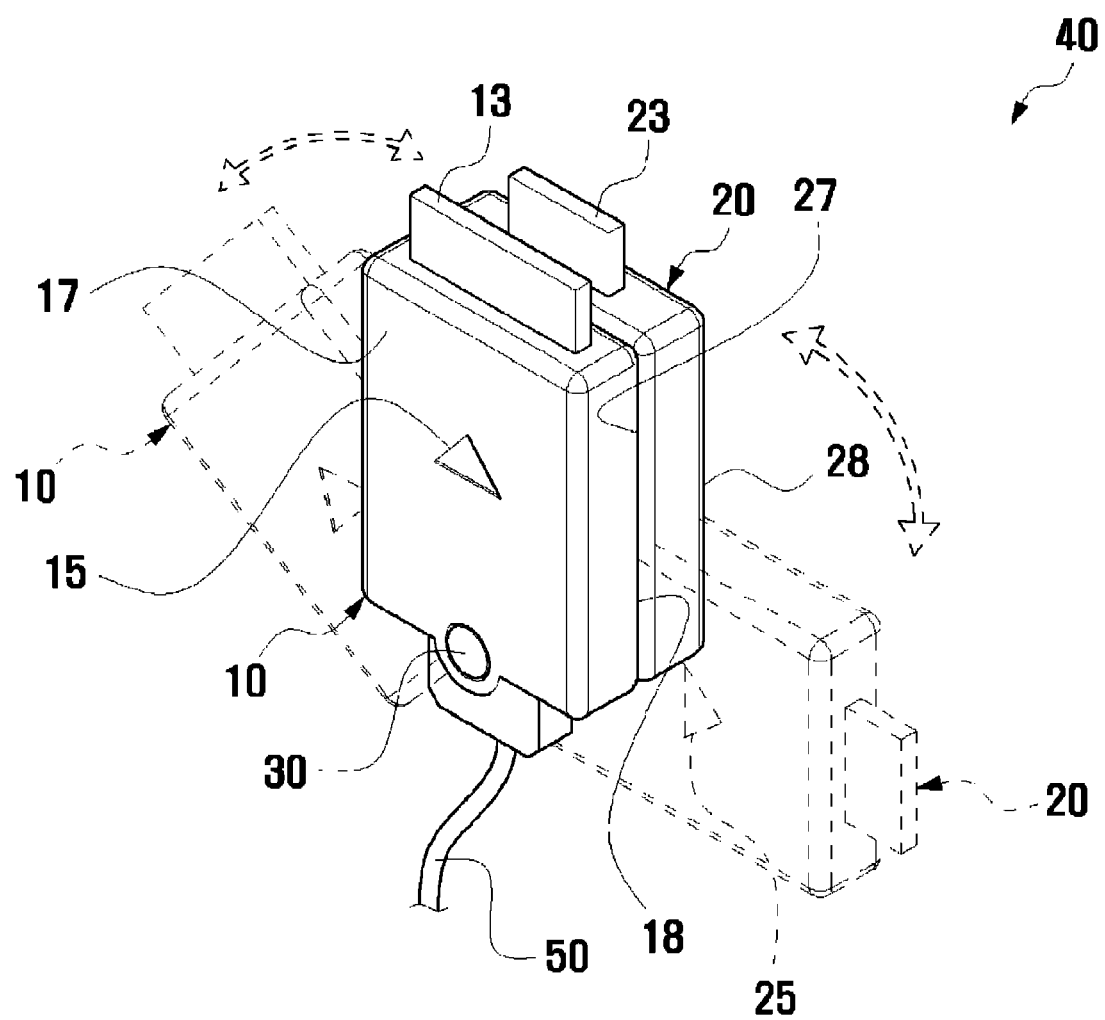
FIG. 2 is a perspective view showing the second connector body of the multi-connector in FIG. 1 once it has been pivoted.

FIG. 1 is a perspective view showing a multi-connector 40 according to an exemplary embodiment of the present invention before a second connector body 20 is pivoted. FIG. 2 is a perspective view showing the second connector body 20 of the multi-connector 40 in FIG. 1 after it is pivoted.

Referring to FIG. 1 and FIG. 2, the multi-connector 40 according to an exemplary embodiment of the present invention is a connector of a portable terminal including a first connector body 10, the second connector body 20, and a hinge shaft 30. The first connector body 10 includes a first connector 13. The second connector body 20 includes a second connector 23. The first connector body 10 and the second connector body 20 are coupled to the hinge shaft 30 to pivot.

The first connector body 10 has a first face 17 and a second face 18 opposite to the first face 17. The first connector 13 protrudes from a side 19 that connects ends of the first and second faces 17 and 18 to each other, and a first lamp 15 is installed on the first face 17.

The second connector body 20 has a first face 27 and a second face 28 opposite to the first face 27. The first face 27 faces the second face 18 of the first connector body 10. A second connector 23 protrudes from a side 29 that connects ends of the first and second faces 27 and 28 to each other, and a second lamp 25 is installed on the first face 27.

The hinge shaft 30 penetrates the first connector body 10 and the second connector body 20 to connect them to each other. Thus, the first connector body 10 and the second connector body 20 can pivot about the hinge shaft 30.

As such, in the multi-connector 40 according to an exemplary embodiment of the present invention, when the first and second connector bodies 10 and 20 pivot about the hinge shaft 30, the first and second connectors 13 and 23 of the respective sides 19 and 29 of the first and second connector bodies 10 and 20 pivot correspondingly and may be connected to the portable terminal without interfering with each other when in the pivoted state.

In this case, the first connector 13 may be a 24-pin connector, and the second connector 23 may be a 20-pin connector.

The first connector 13 may be a model that is standardized by the KTTA and has 24 pins arranged in a line. The 24 pins may include seven charging pins, eight data communication pins, five hands free pins, and four other pins. The second connector 23 may have 20 pins arranged in two lines. The 20 pins may include five charging pins, five data communication pins, five audio/video pins, and five other pins. Thus, the portable terminal may be recharged and may perform data communication through the first and second connectors 13 and 23.

The first lamp 15 is installed on the first face 17 of the first connector body 10 and the second lamp 25 is installed on the first face 27 of the second connector body 20. The second lamp 25 may be installed at a position of the first face 27 such that it is exposed when the second connector body 20 pivots about the hinge shaft 30 so a user may check the state of the second lamp 25 when the second connector 23 is being used.

Although the first connector 13 is a 24-pin connector and the second connector 23 is a 20-pin connector in this exemplary embodiment, the connectors are not limited thereto. For example, the first connector may be a 20-pin connector and the second connector may be a 24-pin connector.

Although not depicted, wires connected to the pins of the second connector 23 may be connected to wires connected to the corresponding pins of the first connector 13 through an overlap portion of the first connector body 10 and the second connector body 20 when the second connector body 20 pivots about the hinge shaft 30.

Figure 3:
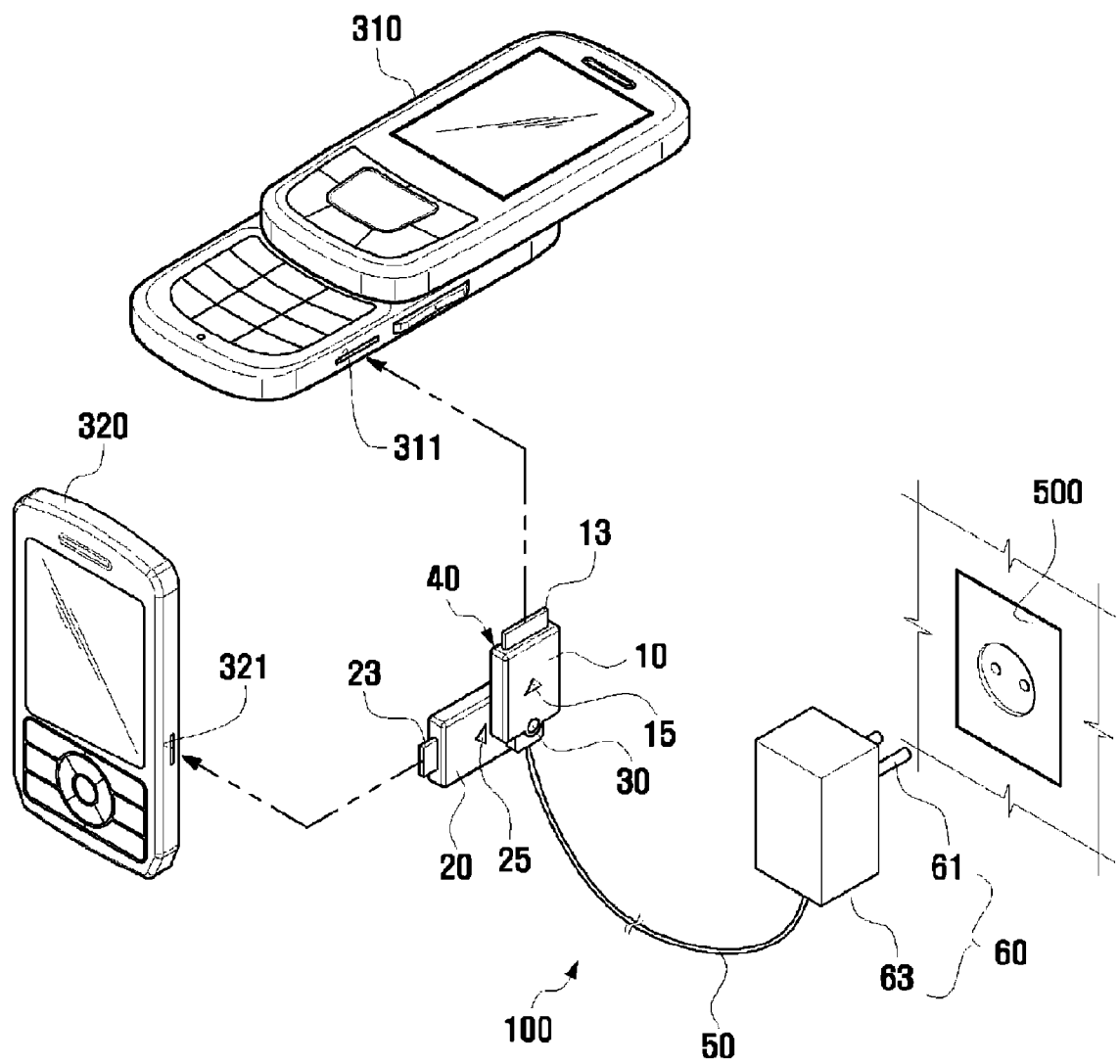
FIG. 3 is a view showing the use of a charging cable having the multi-connector according to an exemplary embodiment of the present invention.
Figure 4:
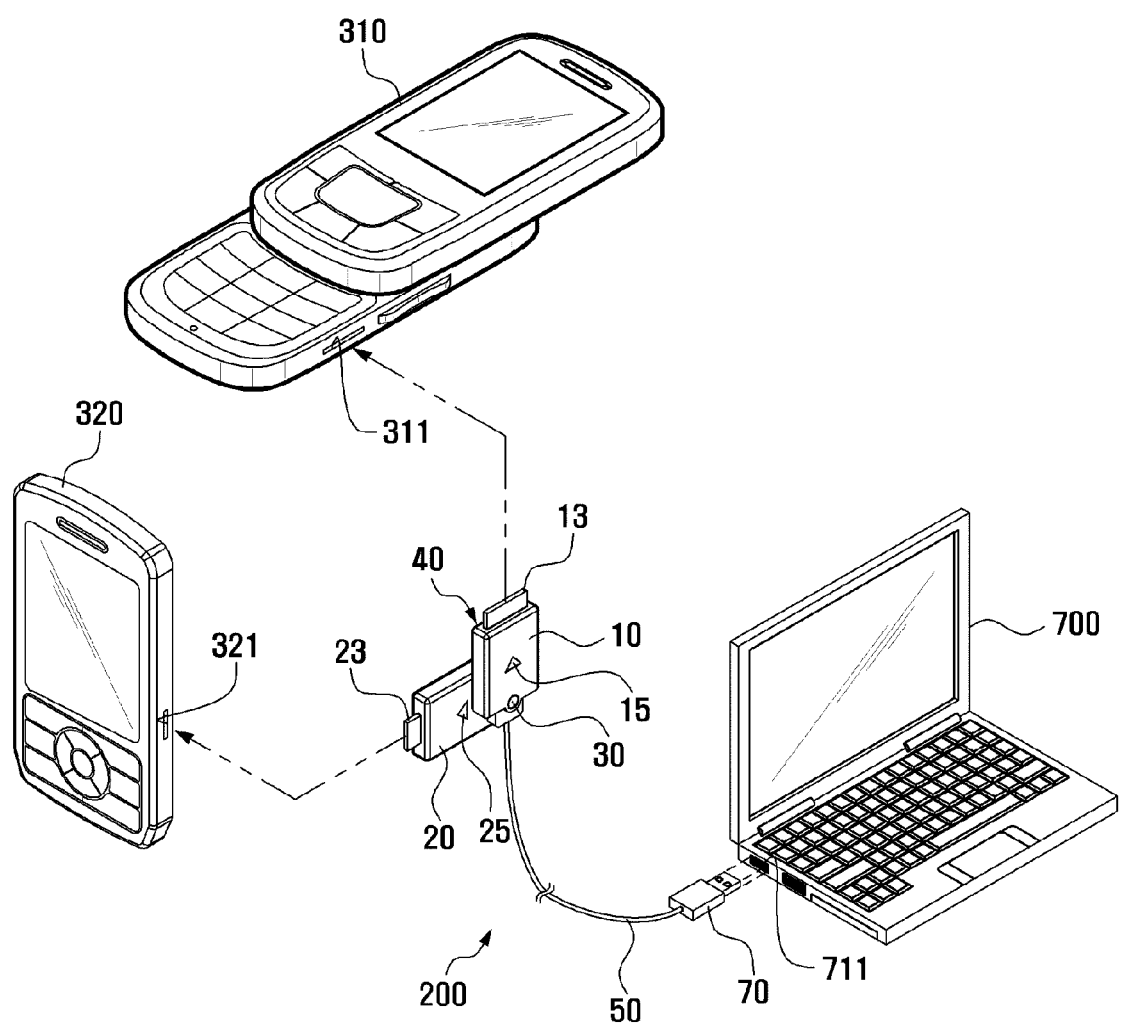
FIG. 4 is a view showing the use of a data cable having the multi-connector according to an exemplary embodiment of the present invention.

The multi-connector 40 according to an exemplary embodiment of the present invention may be connected to a charging cable 100 as shown in FIG. 3, or a data cable 200 as shown in FIG. 4.

As shown in FIG. 3, the charging cable 100 having the multi-connector 40 according to an exemplary embodiment of the present invention includes the multi-connector 40, a cable 50, and a charging unit 60. The charging cable 100 has a structure in which the multi-connector 40 and the charging unit 60 are connected to ends of the cable 50. The first connector body 10 is connected to a first end of the cable 50 and the charging unit 60 is connected to a second end of the cable 50 that is opposite the first end of the cable 50.

The charging unit 60 may include a power plug 61 inserted into an electric socket 500 to supply electric power, and a DC power unit 63 to convert AC power supplied through the power plug 61 into DC power.

A first and/or second portable terminal 310 and 320 may be charged using a charging cable 100 as follows. The first portable terminal 310 includes a first socket 311 to receive the first connector 13. The second portable terminal 320 includes a second socket 321 to receive the second connector 23.

The user pivots the first connector body 10 and the second connector body 20 of the multi-connector 40. Next, the user inserts the first connector 13 into the first socket 311 of the first portable terminal 310 and inserts the second connector 23 into the second socket 321 of the second portable terminal 320. Then, the user puts the power plug 61 of the charging unit 60 into the socket 500 to charge the first and second portable terminals 310 and 320.

The first lamp 15 of the first connector body 10 and the second lamp 25 of the second connector body 20 emit red light or blue light according to charging states of the first and second portable terminals 310 and 320. For example, the first and second lamps 15 and 25 may emit red light during charging, and may emit blue light when charging is completed. The first lamp 15 may twinkle when there is a loose contact between the first connector 13 and the first socket 311, and the second lamp 25 may twinkle when there is a loose contact between the second connector 23 and the second socket 321. Thus, the user may confirm the charging and connection statuses of the first and second portable terminals 310 and 320 by the red light or the blue light emitted from the first and second lamps 15 and 25 of the first and second connector bodies 10 and 20.

Although the first and second portable terminals 310 and 320 are connected to the first and second connectors 13 and 23 of the charging cable 100 at the same time in this exemplary embodiment, only one of the portable terminals 310 and 320 is connected to the charging cable at a time in other exemplary embodiments.

As shown in FIG. 4, the data cable 200 having the multi-connector 40 according to an exemplary embodiment of the present invention includes the multi-connector 40, a cable 50, and a universal serial bus (USB) connector 70. The data cable 200 has a structure in which the multi-connector 40 and the USB connector 70 are connected to ends of the cable 50. The first connector body 10 is connected to a first end of the cable 50 and the USB connector 70 is connected to a second end of the cable 50 that is opposite the first end of the cable 50.

A first or second portable terminal 310 or 320 may be connected to a laptop computer 700 using a data cable 200 as follows. The first portable terminal 310 includes a first socket 311 to receive the first connector 13. The second portable terminal 320 includes a second socket 321 to receive the second connector 23. The laptop computer 700 includes a USB socket 711 to receive the USB connector 70.

The user pivots the first connector body 10 and the second connector body 20 of the multi-connector 40. Next, the user inserts the first connector 13 into the first socket 311 of the first portable terminal 310 or the second connector 23 into the second socket 321 of the second portable terminal 320. Then, the user inserts the USB connector 70 into the USB socket 711 of the laptop computer 700 to connect the first and second portable terminals 310 or 320 to the laptop computer 700.

When the USB connector 70 is inserted into the USB socket 711 of the laptop computer 700, the first lamp 15 of the first connector body 10 and the second lamp 25 of the second connector body 20 may emit red light according to connection states of the first and second portable terminals 310 and 320. In the event of a loose contact between the first connector 13 and the first socket 311, the first lamp 15 may twinkle. In the event of a loose contact between the second connector 23 and the second socket 321, the second lamp 25 may twinkle. Thus, the user may confirm the connection statuses of the first and second portable terminals 310 and 320 by the red light emitted from the first and second lamps 15 and 25 of the first and second connector bodies 10 and 20.

Although, in this exemplary embodiment of the present invention, the first and second portable terminals 310 and 320 are connected to the first and second connectors 13 and 23 of the data cable 200 at the same time, only one of the portable terminals 310 and 320 may be connected to the data cable 200 at a time in other exemplary embodiments. In addition, the first and second portable terminals 310 and 320 may be charged through the data cable 200 connected to the laptop computer 700.

Thus, when the USB connector 70 is connected to the laptop computer 700 while the first or second connector 13 or 23 is connected to the first or second portable terminal 310 or 320, the first or second portable terminal 310 or 320 may be charged or the data communication may be performed between the first or second portable terminal 310 or 320 and the laptop computer 700.

Exemplary Embodiment 2

Figure 5:
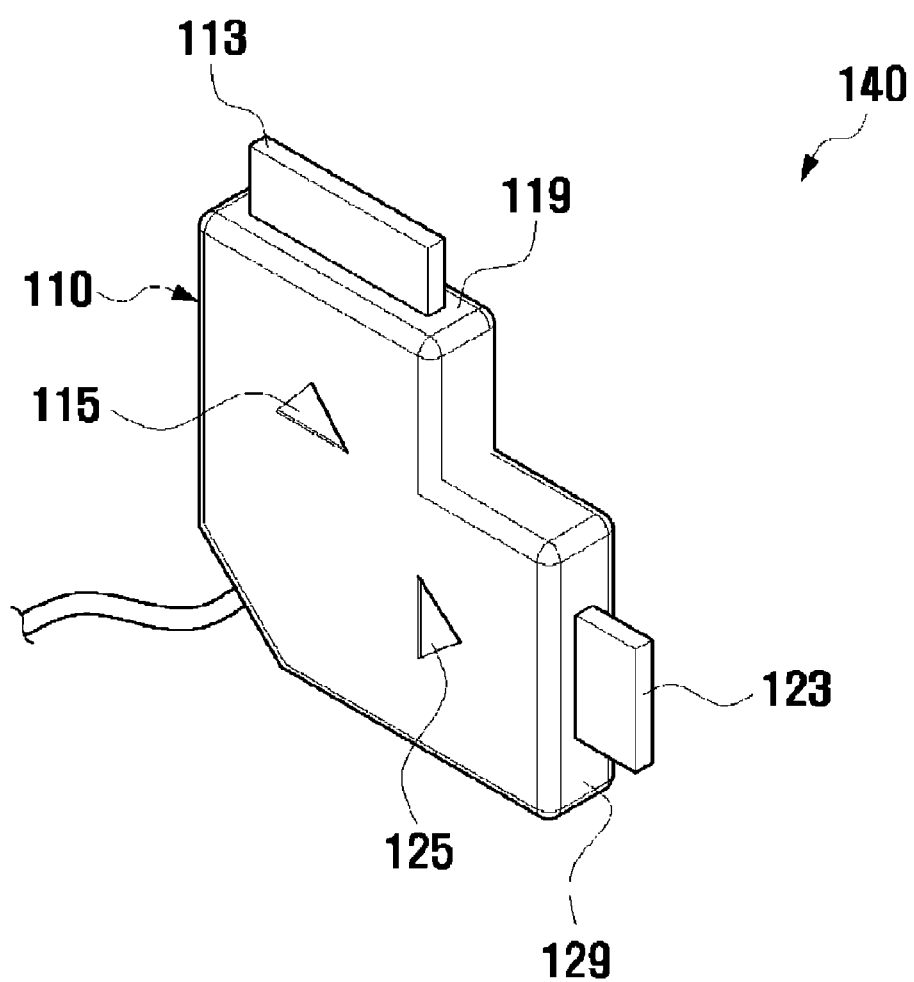
FIG. 5 is a perspective view showing a multi-connector according to another exemplary embodiment of the present invention.

FIG. 5 is a perspective view showing a multi-connector 140 according to another exemplary embodiment of the present invention.

Referring to FIG. 5, the multi-connector 140 includes a connector body 110, and first and second connectors 113 and 123 formed in the connector body 110.

The first connector 113 protrudes from a first side of the connector body 110. The second connector 123 protrudes from a second side of the connector body 110 in a direction different from that of the first side from which the first connector 113 protrudes. The L-shaped connector body 110 has first and second ends 119 and 129 from which the first and second connectors 113 and 123 protrude, respectively.

First and second lamps 115 and 125 are installed on faces neighboring the first and second ends 119 and 129 from which the first and second connectors 113 and 123 protrude. The first lamp 115 is installed near the first connector 113 and the second lamp 125 is installed near the second connector 123.

For example, the first connector 113 may be a 24-pin connector, and the second connector 123 may be a 20-pin connector. Thus, according to a socket of the portable terminal, the user may selectively connect the first or second connector 113 or 123 to the portable terminal to charge the portable terminal or to perform the data communication.

The multi-connector 140 according to another exemplary embodiment of the present invention may be a charging cable or a data cable.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-connector, comprising:
a first connector body comprising a first connector and first, second, and third surfaces;
a second connector body comprising a second connector and first, second, and third surfaces; and
a hinge shaft connecting the first connector body to the second connector body,
wherein the first connector protrudes from the third surface of the first connector body extending from the first and second surfaces of the first connector body penetrated by the hinge shaft, and the second connector protrudes from the third surface of the second connector body extending from the first and second surfaces of the second connector body penetrated by the hinge shaft, the first connector body and/or the second connector body being pivotable about the hinge shaft.

2. The multi-connector of claim 1, wherein the first connector and the second connector respectively comprise pin connectors having different numbers of pins from each other.

3. The multi-connector of claim 2, wherein the first connector comprises a 24-pin connector and the second connector comprises a 20-pin connector.

4. The multi-connector of claim 1, further comprising:
a first light emitter provided on the first surface of the first connector body to indicate an operation mode of the first connector; and
a second light emitter provided on the first surface of the second connector body to indicate an operation mode of the second connector.

5. The multi-connector of claim 1, further comprising a cable connected through a fourth surface of the first connector body, the fourth surface extending from the first and second surfaces and opposite the third surface.

6. A charging cable, comprising:
a multi-connector comprising:
a first connector body comprising a first connector and first, second, and third surfaces,
a second connector body comprising a second connector and first, second, and third surfaces, and a hinge shaft connecting the first connector body to the second connector body, wherein the first connector protrudes from the third surface of the first connector body extending from the first and second surfaces of the first connector body penetrated by the hinge shaft, and the second connector protrudes from the third surface of the second connector body extending from the first and second surfaces of the second connector body penetrated by the hinge shaft, the first connector body and/or the second connector body being pivotable about the hinge shaft;

a charging unit comprising a power plug and a DC power unit; and a cable to connect the multi-connector to the charging unit.

7. The charging cable of claim 6, wherein the first connector and the second connector respectively comprise pin connectors having different numbers of pins from each other.

8. The charging cable of claim 7, wherein the first connector comprises a 24-pin connector and the second connector comprises a 20-pin connector.

9. A data cable, comprising:

a multi-connector comprising:

a first connector body comprising a first connector and first, second, and third surfaces, a second connector body comprising a second connector and first, second, and third surfaces, and a hinge shaft connecting the first connector body to the second connector body, wherein the first connector protrudes from the third surface of the first connector body extending from the first and second surfaces penetrated by the hinge shaft, and the second connector protrudes from the third surface of the second connector body extending from the first and second surfaces penetrated by the hinge shaft, the first connector body and/or the second connector body being pivotable about the hinge shaft;

a universal serial bus (USB) connector; and a cable to connect the multi-connector to the USB connector.

10. The data cable of claim 9, wherein the first connector and the second connector respectively comprise pin connectors having different numbers of pins from each other.

11. The data cable of claim 10, wherein the first connector comprises a 24-pin connector and the second connector comprises a 20-pin connector.

* * * * *